US012749604B2

(12) United States Patent
Chen et al.

(10) Patent No.: US 12,749,604 B2
(45) Date of Patent: Sep. 29, 2026

(54) M-TYPE HEXAFERRITE COMPRISING A LOW DIELECTRIC LOSS CERAMIC

(71) Applicant: ROGERS CORPORATION, Chandler, AZ (US)

(72) Inventors: Yajie Chen, Andover, MA (US); Yu Wang, Malden, MA (US)

(73) Assignee: ROGERS CORPORATION, Chandler, AZ (US)

( * ) Notice: Subject to any disclaimer, the term of this patent is extended or adjusted under 35 U.S.C. 154(b) by 949 days.

(21) Appl. No.: 17/923,125

(22) PCT Filed: May 12, 2021

(86) PCT No.: PCT/US2021/031904
§ 371 (c)(1),
(2) Date: Nov. 3, 2022

(87) PCT Pub. No.: WO2021/231519
PCT Pub. Date: Nov. 18, 2021

(65) Prior Publication Data
US 2023/0352221 A1 Nov. 2, 2023

Related U.S. Application Data

(60) Provisional application No. 63/023,303, filed on May 12, 2020.

(51) Int. Cl.
*H01F 1/34* (2006.01)
*C04B 35/26* (2006.01)
(Continued)

(52) U.S. Cl.
CPC ......... *H01F 1/344* (2013.01); *C04B 35/2633* (2013.01); *C04B 35/6262* (2013.01);
(Continued)

(58) Field of Classification Search
CPC .............. H01F 1/344–348; C04B 35/26–2691
See application file for complete search history.

(56) References Cited

U.S. PATENT DOCUMENTS 2,960,471 A * 11/1960 Gorter ................. C04B 35/2633 252/62.63
3,020,426 A 2/1962 Van Der Burgt
(Continued)

FOREIGN PATENT DOCUMENTS

CN 101723654 A 6/2010
CN 102486655 A 6/2012
(Continued)

OTHER PUBLICATIONS

Shigemura. Synthesis of non-magnetic-ion substituted Ca-based M-type ferrite. Journal of the Magnetics Society of Japan, 2017, vol. 41, Issue 5, pp. 94-98, Released on J-STAGE Sep. 1, 2017 (Year: 2017).*

(Continued)

*Primary Examiner* — Matthew E. Hoban
(74) *Attorney, Agent, or Firm* — CANTOR COLBURN LLP

(57) ABSTRACT

In an aspect, an M-type ferrite, comprises oxides of Me, Me', Me", Co, Ti, and Fe; wherein Me is at least one of Ba, Sr, or Pb; Me' is at least one of Ti, Zr, Ru, or Ir; and Me" is at least one of Mg or Ca. In another aspect, a method of making an M-type ferrite comprises milling ferrite precursor compounds comprising oxides of at least Co, Fe, Ti, Me, Me', and Me", to form an oxide mixture; wherein Me comprises at least one of Ba, Sr, or Pb; Me' is at least one of Ti, Zr, Ru, or Ir; and Me" is at least one of Mg or Ca; and calcining the oxide mixture in an oxygen or air atmosphere to form the M-type ferrite.

22 Claims, 2 Drawing Sheets

(51) Int. Cl.
*C04B 35/626* (2006.01)
*C04B 35/634* (2006.01)
*C04B 35/64* (2006.01)

(52) U.S. Cl.
CPC ........ *C04B 35/63416* (2013.01); *C04B 35/64* (2013.01); *C04B 2235/3206* (2013.01); *C04B 2235/3236* (2013.01); *C04B 2235/3274* (2013.01); *C04B 2235/3277* (2013.01); *C04B 2235/442* (2013.01); *C04B 2235/6567* (2013.01); *C04B 2235/662* (2013.01); *C04B 2235/786* (2013.01)

(56) References Cited

U.S. PATENT DOCUMENTS

| | | | |
|---|---|---|---|
| 3,036,007 | A | 5/1962 | Buykx et al. |
| 4,569,775 | A | 2/1986 | Kubo et al. |
| 4,664,831 | A | 5/1987 | Hibst et al. |
| 4,957,812 | A | 9/1990 | Aoki et al. |
| 5,110,651 | A | 5/1992 | Massard et al. |
| 5,452,167 | A | 9/1995 | Nago |
| 5,494,749 | A | 2/1996 | Kubo et al. |
| 5,591,276 | A | 1/1997 | Yoshizawa et al. |
| 5,593,612 | A | 1/1997 | Lubitz |
| 5,616,414 | A | 4/1997 | Hopstock et al. |
| 6,071,430 | A | 6/2000 | Lebourgeois et al. |
| 6,436,307 | B1 | 8/2002 | Lebourgeois et al. |
| 6,736,990 | B2 | 5/2004 | Aoki et al. |
| 7,348,374 | B2 | 3/2008 | Martinazzo |
| 7,482,977 | B2 | 1/2009 | Kuroda et al. |
| 8,263,224 | B2 | 9/2012 | Tokiwa |
| 8,305,281 | B2 | 11/2012 | Suetsuna et al. |
| 8,758,721 | B2 | 6/2014 | Hill |
| 10,071,421 | B2 | 9/2018 | Suetsuna et al. |
| 10,090,088 | B2 | 10/2018 | Suetsuna et al. |
| 10,468,169 | B2 | 11/2019 | Chen et al. |
| 10,766,786 | B2 | 9/2020 | Chen et al. |
| 2002/0039667 | A1 | 4/2002 | Takaya et al. |
| 2002/0050309 | A1 | 5/2002 | Marusawa |
| 2003/0052298 | A1 | 3/2003 | Wang et al. |
| 2003/0091841 | A1 | 5/2003 | Marusawa |
| 2004/0054029 | A1 | 3/2004 | Fujiki et al. |
| 2005/0123743 | A1 | 6/2005 | Martinazzo |
| 2007/0231614 | A1 | 10/2007 | Kondo et al. |
| 2008/0149882 | A1 | 6/2008 | Terazono et al. |
| 2009/0057606 | A1 | 3/2009 | Tada et al. |
| 2009/0101873 | A1 | 4/2009 | Tan et al. |
| 2010/0060539 | A1 | 3/2010 | Suetsuna et al. |
| 2010/0068512 | A1 | 3/2010 | Imaoka et al. |
| 2011/0147643 | A1 | 6/2011 | Ryou et al. |
| 2012/0049100 | A1 | 3/2012 | Yonetsu et al. |
| 2012/0068103 | A1 | 3/2012 | Hill et al. |
| 2012/0085963 | A1 | 4/2012 | An et al. |
| 2012/0229354 | A1 | 9/2012 | Ishikura et al. |
| 2013/0292602 | A1 | 11/2013 | Hill |
| 2014/0264145 | A1 | 9/2014 | Ray et al. |
| 2014/0291571 | A1 | 10/2014 | Riden |
| 2014/0346387 | A1 | 11/2014 | Hill et al. |
| 2015/0310971 | A1 | 10/2015 | Kmetz et al. |
| 2016/0086700 | A1 | 3/2016 | Suetsuna et al. |
| 2016/0086728 | A1 | 3/2016 | Suetsuna et al. |
| 2016/0118171 | A1 | 4/2016 | Hill |
| 2016/0276072 | A1 | 9/2016 | Sethumadhavan et al. |
| 2017/0098885 | A1 | 4/2017 | Hill et al. |
| 2017/0213628 | A1 | 7/2017 | Chen et al. |
| 2019/0040226 | A1 | 2/2019 | Aga et al. |
| 2019/0081377 | A1 | 3/2019 | Hill et al. |
| 2019/0264005 | A1 | 8/2019 | Horn et al. |
| 2019/0300379 | A1 | 10/2019 | Kojima et al. |
| 2019/0318858 | A1 | 10/2019 | Chen et al. |
| 2021/0065943 | A1 | 3/2021 | Zhang et al. |
| 2021/0179442 | A1 | 6/2021 | Chen et al. |
| 2021/0225566 | A1 | 7/2021 | Zhang et al. |
| 2021/0246046 | A1 | 8/2021 | Chen et al. |
| 2022/0367093 | A1 | 11/2022 | Chen et al. |
| 2022/0367094 | A1 | 11/2022 | Chen et al. |
| 2023/0352222 | A1 | 11/2023 | Chen et al. |
| 2023/0352223 | A1 | 11/2023 | Chen et al. |
| 2023/0399237 | A1 | 12/2023 | Chen et al. |
| 2024/0158302 | A1 | 5/2024 | Chen et al. |
| 2024/0203624 | A1 | 6/2024 | Chen et al. |

FOREIGN PATENT DOCUMENTS

| | | | |
|---|---|---|---|
| CN | 104379537 | A | 2/2015 |
| DE | 3907220 | | 9/1990 |
| EP | 0620571 | A2 | 10/1994 |
| EP | 0884740 | A1 | 12/1998 |
| EP | 0905718 | A1 | 3/1999 |
| EP | 1541641 | A1 | 6/2005 |
| EP | 1652829 | A2 | 5/2006 |
| EP | 2028663 | A1 | 2/2009 |
| EP | 2214180 | A1 | 8/2010 |
| EP | 2784044 | A1 | 10/2014 |
| EP | 3012843 | A1 | 4/2016 |
| JP | S621149 | A | 1/1987 |
| JP | S6245005 | A | 2/1987 |
| JP | 62216922 | A | 9/1987 |
| JP | S62216922 | A | 9/1987 |
| JP | S6489504 | A | 4/1989 |
| JP | H01200605 | A | 8/1989 |
| JP | H02120237 | A | 5/1990 |
| JP | H05101930 | A | 4/1993 |
| JP | H0615411 | B2 | 3/1994 |
| JP | H06338410 | A | 12/1994 |
| JP | H09167703 | | 6/1997 |
| JP | H09213513 | A | 8/1997 |
| JP | H09232123 | A | 9/1997 |
| JP | 2000235916 | A | 8/2000 |
| JP | 2000277973 | | 10/2000 |
| JP | 2001085210 | A | 3/2001 |
| JP | 2008169378 | A | 7/2008 |
| JP | 2009105365 | A | 5/2009 |
| JP | 2009155545 | A | 7/2009 |
| JP | 2010109056 | A | 5/2010 |
| JP | 2015191935 | A | 11/2015 |
| JP | 2017037999 | A | 2/2017 |
| JP | 6534418 | B2 | 6/2019 |
| TW | M417764 | | 12/2011 |
| WO | 9600454 | A1 | 1/1996 |
| WO | 2011081399 | A2 | 7/2011 |
| WO | 2012103020 | A2 | 8/2012 |
| WO | 2016064459 | | 4/2016 |
| WO | 2016123598 | A1 | 8/2016 |
| WO | 2017068444 | | 4/2017 |
| WO | 2018043943 | A1 | 3/2018 |
| WO | 2020162295 | A1 | 8/2020 |
| WO | 2021061599 | A1 | 4/2021 |
| WO | 2021162886 | A1 | 8/2021 |

OTHER PUBLICATIONS

Nanao. Machine translation of JP H0615411B2. Published on Mar. 2, 1994. Machine translation created on Dec. 1, 2025 (Year: 1994).*

Vu. CuO-based sintering aids for low temperature sintering of BaFe12O19 ceramics. Journal of Asian Ceramic Societies. 1 (2013) 170-177 (Year: 2013).*

Faouri et. al., "High quality factor cold sintered Li2MoO4—BaFe12O19 composites for microwave applications," Mar. 2019, Acta Materialia, vol. 166, pp. 202-207.

Li, Qifan, et al. "Emerging magnetodielectric materials for 5G communications: 18H hexaferrites," Acta Materialia 231 (2022) 117854 Elsevier Ltd., 10 pages.

Allia et al.; "Fe304 nanoparticles and nanocomposites and potential application in biomedicine and in communication technologies: Nanoparticle aggregation, interaction, and effective magnetic anisotropy"; J. of Applied Physics 116; 113903 (2014) 10 pgs.

Aoyama et al.; "Preparation and Characterization of Z-type Hexaferrites, Ba3(1-x)Sr3xCo2Fe24O41 with x=0-0.5, via a two-step calcination with an intermediate wet milling"; J.Electroceram; 17; pp. 61-64 (2006).

(56) References Cited

OTHER PUBLICATIONS

Bid et al.; "Microstructure Characterization of Mechanosynthesized Nanocrystalling NiFe2O4 by Rietveld's Analysis"; Physica E 39; pp. 175-184; (2007).
Bierlich et al., "Low-temperature sintering and magnetic properties of Sc- and In-substituted M-type hexagonal barium ferrites for microwave applications", Abstract, Feb. 2017 Materials Research Bulletin 86:19-23 ;11 pages.
Boix, Rafael R., et al., "Characteristics of Aperture Coupled Microstrip Antennas on Magnetized Ferrite Substrates", IEEE Transactions on Antennas and Propagation, vol. 53, No. 6, (Jun. 1, 2005), pp. 1957-1966.
Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.
Cao et al. "Hydrogen-Induced Lateral Growth of Nickel Coating on Ba3Co2Fe24O4 (Co2Z-Based Hexaferrite during the Electroplating of Multilayer Chip Inductors," Journal of The Electrochemical Society, 2002, vol. 149 Issue 12, pp. J89-J92.
Chicinas, I.; "Soft Magnetic Nanocrystalline Powders Produced by Mechanical Alloying Routes"; Journal of Optoelectronics and Advanced Materials; 8(2); pp. 439-448; (2006).
Cruz-Montoya et al., "Synthesis and characterization of polymer nanocomposites containing magnetic nanoparticles"; Journal of Applied Physics 107; 09B506 (2010); 4 pgs.
Dedi et al., "Magnetic properties of cobalt ferrite synthesized by mechanical alloying", AIP Conference Proceedings, 1964; 020003 2018; 5 pages.
Deng, et al; Effect of Bi and Mo Doping on Magnetic and Sintered Characteristics of MgCuZn Ferrite, Journal of Inorganic Materials, 2008, pp. 670-672, vol. 23 No. 4.
EP Supplemental Search Report; EP Application No. 15853114; Mailed Nov. 21, 2017; 8 pages.
Guo et al. Abstract of "Magnetic Properties of Ir4+ Doped Co2 Z Type Hexagonal Ferrites," Journal of Rare Earths, pp. 220-222, vol. 25, Supplement 2, Jun. 2007; 7 pgs.
Haijun et al., "The preparation and microwave properties of Ba3ZnzCo2-zFe24041 ferrite by citrate sol-gel process", Materials Science and Engineering, B84, 2001, pp. 252-257.
Han et al.; "Microwave-absorption properties of Fe(Mn)/ferrite nanocapsules"; J. Phys. D: Appl. Phys. 42; (2009) 5 pages.
Hansen et al., "Antennas with Magneto-Dielectrics", Microwave and Optical Technology Letters, vol. 26, No. 2, Jul. 2000, pp. 75-78.
Huang et al; "Magnetic epoxy nanocomposites with superparamegnetic MnFe204 nanoparticles"; AIP Advance 5; 097183 (2015); 16 pgs.
Ismail et al.; "Magnetic Properties of Mechanically Alloyed Cobalt-Zinc Ferrite Nanoparticles"; J. Supercond Nov Magn; 27; pp. 1293-1298; (2014).
Kim et al., "Effects of in3+ site occupancy on the magnetic properties of M-type strontium hexaferrites", AIB Advances 10, 015040 (2020); https://doi.org/10.1063/1.5130073; 5 pages.
Koch, C. C.; "Materials Synthesis by Mechanical Alloying"; Annu. Rev. MaterSci. 19; pp. 121-143; (1989).
Koch, C.C.; "Intermetallic Matrix Composites Prepared by Mechanical Alloying—a Review"; Materials Science and Engineering: A244; pp. 39-48; (1998).
Kong et al., "Ni—Zn Ferrites Composites With Almost Equal Values of Permeability and Permittivity for Low-Frequency Antenna Design," IEEE Transactions on Magnetics, Jan. 2007, pp. 6-9, vol. 43, No. 1.
Kristiantoro et al. , "Magnetic properties of cobalt ferrite synthesized by mechanical alloying", from AIP Conf 1964, 020003 (2018) Published Online May 15, 2018; 5 pages.
Lee et al., "Low Loss Co2Z (Ba3Co2Fe24O41)—Glass Composite for Gigahertz Antenna Application," Journal of Applies Physics, 2011, vol. 109, 07E530-2.
Li et al.; "Microstructure effects on shock-induced surface jetting"; Journal of Applied Physics 115; 073504 (2014); pp. 11.
Li, Jie, et al. "Structural and magnetic properties of M—Ti (M=Ni or Zn) co-substituted M-type barium ferrite by a novel sintering process," Journal of Materials Science: Materials in Electronics. Chapman and Hall, London, GB; vol. 26; No. 2; Nov. 15, 2014, pp. 1060-1065.
Liu et al.; "Corrigendum: Electromagnetic-wave-absorption properties of wire-like structures self-assembled by FeCo nanocapsules"; J. Phys. D: Appl. Phys. 45; (2012); 7 pages.
Lui, Chaocheng, et al. "Characterizations of magnetic transition behavior and electromagnetic properties of Co—Ti co-substituted SrM-based hexaferrites SrCoxTixFe12-2xO19 compounds," Journal of Alloys and Compounds, vol. 784, Jan. 11, 2019, pp. 1175-1186.
Mahmood, Sami H., et al. "Modification of the Magnetic Properties of Co<sub>2</sub>Y Hexaferrites by Divalent and Trivalent Metal Substitutions," Solid State Phenomena, vol. 241; Oct. 2015, pp. 93-125.
Mattei et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.
Morch et al. "Structure and Magnetic properties of W-type hexaferrites," 2019, IUCRJ, pp. 492-499, vol. 6.
Mou, Fangzhi et al., "Oriented Contraction: A Facile Nonequilibrium Heat-Treatment Approach for Fabrication of Maghemite Fiber-in-Tube and Tube-in-Tube Nanostructures", Langmuir 2010, 26 (19), pp. 15580-15585.
Mu et al., "Improvement of high-frequency characteristics of Z-type hexaferrite by dysprosium doping", Journal of Applied Physics, 109, 123925, 2011, 6 pages.
Narayanasamy et al. "Influence of mechanical milling and thermal annealing on electrical and magnetic properties of nanostructured Ni-Zn and cobalt ferrites", Bulletin of Materials Science, vol. 31, No. 3 Jun. 1, 2008; pp. 373-380.
Ohnuma et al., "Soft Magnetic Properties of FeN/FeBN Multilayers," Journal on Magnetics, Nov. 1992, pp. 896-901, vol. 7 No. 11.
Ohnuma et al., "Soft Magnetic Multilayers for Micromagnetic Devices," Journal of Magnetism and Magnetic Materials, 1993, pp. 556-562, vol. 126.
Pal et al.; "Synthesis and magnetic properties of gold coated iron oxide nanoparticles"; Journal of Applied Physics 105; 07B504 (2009); 4 pgs.
Park et al. "Design of Wide bandwidth microwave absorber with Ferrite composites of broad magnetic loss specturm," Advanced Materials Engineering, 2015.
Pasko et al. "Magnetic and Structural characterization of nanosized BaCoxZn2-xFe16027 hexaferrite in the vicinity of spin reorientation transition," 2011, Journal of Physics: Conference Series 303.
Pullar et al; "Hexagonal Ferrites: A Review of the Synthesis, Properties and Applications of Hexaferrite Ceramica"; Progress in Materials Science; 57; pp. 1191-1134; (2012).
Pullar, "Hexagonal Ferrites: A Review of the synthesis, properties and application of hexaferrite ceramics," Mar. 2012, Progress in Material Science, vol. 57, No. 7, pp. 1191-1334.
Sahoo et al. Enhanced Magnetoelectricity in Bismuth Substituted SrFe12O19 Hexaferrite, Aug. 2019, Journal of Applied Physics, vol. 126, No. 7.
Sahu et al.; "Influence of excess Fe accumulation over the surface of FePt nanoparticles: Structural and magnetic properties"; Journal of Applied Physics 113; 134303 (2013); 1 pg Abstract only.
Sepelak et al.; "Nanocrystalline Nickel Ferrite, NIFe204: Mechanosynthesis, Nonequilibrium Cation Distribution, Canted Spin Arrangement, and Magnetic Behavior"; J.Phys.Chem. C; 111; pp. 5026-5033; (2007).
Sepelak et al.; "Structural and Magnetic Properties of Nanosize Mechanosynthesized Nickel Ferrite"; Jounral of Magnetism and Magnetic Materials; 272-276; pp. 1616-1618; (2004).
Sharma et al.; "Ultra Low Loss Soft Magnetic Nanoparticles for Applications Up to S-band," Applied Physics Letters, vol. 103. 112402, Sep. 2013.

(56) References Cited

OTHER PUBLICATIONS

Singh et al. "Static Magnetic Properties of Co and Ru substituted Ba—Sr ferrite," 2008, Materials Research Bulletin, pp. 176-184, vol. 43.
Thakur et al., "Low-loss Spinel Nanoferrite with Matching Permeability and Permittivity in the Ultrahigh Frequency Range," Journal of Applied Physics • Jul. 2010, vol. 108.
Thanh Ba Do; "High Temperature Composite Materials and Magnetodielectric Composites for Microwave Application"; Dissertation; University of Michigan; 2010; 223 pages.
Wu et al.; "Studies of high-frequency magnetic permeability of rod-shaped CrO2 nanoparticles"; Phys. Stat. Sol. (a) 204; No. 3; pp. 755-762; 2007.
Yang, Guo-Min, et al., "Miniaturized Patch Antennas with Ferrite/Dielectric/Ferrite Magnetodielectric Sandwich Substrate", Piers Online, vol. 7, No. 7, (Jan. 1, 2011), pp. 609-612.
Yang, Guo-Min, et al., "Novel Compact and Low-Loss Phase Shifters With Magnetodielectric Disturber", IEEE Microwave and Wireless Components Letters, vol. 21, No. 5, (May 1, 2011); pp. 240-242.
Zaher et al.; "Osmotically driven drug delivery through remote-controlled magnetic nanocomposite membranes"; Biomicrofluidics 9; 054113 (2015); 17 pgs.
Zhen et al.; "Microwave absorption properties of FeNI3 submicrometre spheres and SiO2@FeNi3 core-shell structures"; J. Phys. D: Appl. Phys. 43; (2010); 7 pages.
Brando et al., "Microwave Electromagnetic Characteristics of New Substituted M-Hexaferrites BaFe12-2xAxMexO19 (A=Ru, Ir ; Me=Co, Zn)", Journal De Physique IV France, Mar. 1997.
Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.
Lee et al. "Role of Small Permeability in Gigahertz Ferrite Antenna Performance," IEEE Magnetics Letter, 2013, vol. 4.
Li et al. "High-frequency magnetic properties of W-type barium-ferrite BaZn2-xCoxFe16O27 composites", Joumal of Applied Physics 94, 5918 (2003): https://doi.org/10.1063/1.1618945.
Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.
Li et al; "Static and Dynamic Magnetic Properties of Co2Z Barium Ferrite Nanoparticle Composites"; Journal of Materials Science, 40, pp. 719-723 (2005).
Su et el., "Low Loss Factor Co2Z Ferrite Composites with Equivalent Permittivity and Permeability for Ultra-high Frequency Applications," Applied Physics Letters, Aug. 2014, vol. 105 No. 062402.
Xu et al., "Structural, dielectric and magnetic properties of Nd-doped Co2Z-type hexaferrites", Jounal of Alloys and Compounds, 509, 2011, pp. 4290-4294.
Guo, Li, et al. "Low temperature co-fired Co2Z barium-strontium ferrite materials with BBSC glass" J Mater Sci: Mater Electron, vol. 27, pp. 2841-2845, Nov. 26, 2015.
Savage, R. O. et al., "Magnetic Properties of Single Crystal CuNi—18H and MgZn—18H Solid Solutions", AIP Conference Proceedings (1975). vol. 24, pp. 491-492, doi.org/10.1063/1.29974.
Tauber, A. et al., "Magnetic Properties of Single Crystal Ba5Me2Ti3Fe12O31, ME=Co, Cu", AIP Conference Proceedings (1972) 5(1):1547-1551 ; https://doi.org/10.1063/1.2953911.
Wang, Yu, et al. "Study on Microwave Performance of Low-Temperature Sintered, Ba(CoTi)1.5Fe9O19 Ferrite for Application at UHF Frequency" J Supercon Nov Magn, vol. 31, pp. 455-461, Jul. 6, 2017.
Carvalheiras et al. "Synthesis of red mud derived M-type barium hexaferrites with tuneable coercivity", Ceramics International, vol. 46, No. 5, 2019-11-07, pp. 5757-5764, XP086001988.
International Search Report (ISA/EPO) mailed Sep. 1, 2021 for PCT/US2021/031904 filed on May 12, 2021, 4 pages.
Li, Qifan. Development of Magnetodielectric Materials with Low Loss and High Snoek's Product for Microwave Applications, Ph.D. Dissertation to The Department of Electrical and Computer Engineering, Northeastern Univ., Boston, MA, Dec. 2020, 150 pgs.
Written Opinion (ISA/EPO) mailed Sep. 1, 2021 for PCT/US2021/031904 filed on May 12, 2021, 5 pages.
You, Jae-Hyoung, et al. Magnetic Properties of Zn-substituted Y-type hexaferrites, Ba2ZnxFe2-xFe12O22, Journal of Magnetism and Magnetic Materials, 471 (2019) 255-261.

* cited by examiner

M-TYPE HEXAFERRITE COMPRISING A LOW DIELECTRIC LOSS CERAMIC

CROSS REFERENCE TO RELATED APPLICATIONS

This application is a National Stage application of PCT/US2021/031904 filed May 12, 2021, which claims the benefit of U.S. Provisional Application No. 63/023,303, filed May 12, 2020, both of which are incorporated by reference in their entirety herein.

BACKGROUND

The disclosure is directed to an M-type hexaferrite comprising a low dielectric loss ceramic.

Improved performance and miniaturization are needed to meet the ever-increasing demands of devices used in very high frequency applications, which are of particular interest in a variety of commercial and defense related industries. As an important component in radar and modern wireless communication systems, antenna elements with compact sizes are constantly being developed. It has been challenging however to develop ferrite materials for use in such high frequency applications as most ferrite materials exhibit relatively high magnetic loss at high frequencies.

In general, hexagonal ferrites, or hexaferrites, are a type of iron-oxide ceramic compound that has a hexagonal crystal structure and exhibits magnetic properties. Several types of families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn, and Sr can be substituted for Ba. Other hexaferrite types include M-type ferrites ($(Ba,Sr)Fe_{12}O_{19}$), W-type ferrites ($(Ba,Sr)Me_2Fe_{16}O_{27}$), X-type ferrites ($(Ba,Sr)_2Me_2Fe_{28}O_{46}$), and U-type ferrites ($(Ba,Sr)_4Me_2Fe_{36}O_{60}$).

Hexaferrites with a high magnetocrystalline anisotropy field are good candidates for gigahertz antenna substrates because they have a high magnetocrystalline anisotropy field and thereby a high ferromagnetic resonance frequency. $Co_2Z$ hexaferrite ($Ba_3Co_2Fe_{24}O_{41}$) materials have been developed for some antenna applications. However, the $Co_2Z$ has disadvantages such as a complex phase transformation. On the other hand, pure M-type hexaferrite (for example, $M'Fe_{12}O_{19}$, where M' can be Ba, Pb, or Sr) has a simple crystal structure that is thermodynamically stable. Therefore, the M-type hexaferrite can be produced at a relatively low temperature of around 900° C. However, pure M-type hexaferrites are generally magnetically hard and show low permeability due to their high magnetocrystalline anisotropy. For at least this reason, M-type hexaferrites are not typically used for very high frequency (VHF), ultra high frequency (UHF), gigahertz (GHz) antenna applications. Improved M-type ferrites are therefore desired.

BRIEF SUMMARY

Disclosed herein is an M-type hexaferrite.

In an aspect, an M-type ferrite, comprises oxides of Me, Me', Me", Co, Ti, and Fe; wherein Me is at least one of Ba, Sr, or Pb; Me' is at least one of Ti, Zr, Ru, or Ir; and Me" is at least one of Mg or Ca; wherein the M-type ferrite comprises a dielectric phase having the formula $Me''TiO_3$.

In another aspect, a composite comprises the M-type ferrite, wherein the M-type ferrite comprises oxides of Me, Me', Me", Co, Ti, and Fe; wherein Me is at least one of Ba, Sr, or Pb; Me' is at least one of Ti, Zr, Ru, or Ir; and Me" is at least one of Mg or Ca.

In yet another aspect, a method of making an M-type ferrite comprises milling ferrite precursor compounds comprising oxides of at least Co, Fe, Ti, Me, Me', and Me", to form an oxide mixture; wherein Me comprises at least one of Ba, Sr, or Pb; Me' is at least one of Ti, Zr, Ru, or Ir; and Me" is at least one of Mg or Ca; and calcining the oxide mixture in an oxygen or air atmosphere to form the M-type ferrite.

The above described and other features are exemplified by the following figures, detailed description, and claims.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

Figure 1:
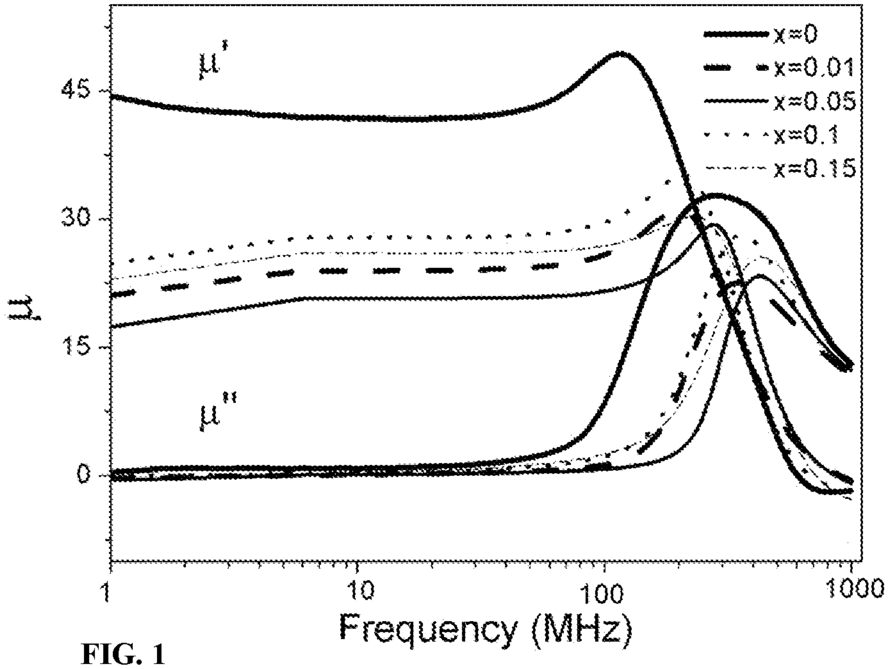
FIG. 1 is a graphical illustration of the magnetic properties of the compositions of Examples 1-5.

Attempts at modifying the uniaxial magnetocrystalline anisotropy of M-phase hexaferrites have included mixing pure BaM hexaferrites with the ions, such as indium, scandium, or cobalt. These attempts though have not proven effective to tailor the uniaxial magnetocrystalline anisotropy to the in-plane magnetocrystalline anisotropy though due to the extremely large uniaxial anisotropy field of 17 kilooersted of the pure BaM hexaferrites.

It was discovered that incorporating a dielectric phase to an M-phase hexaferrite results in a composition with easily tunable magnetic properties. By varying the amounts of the respective components the figure of merit and Snoek product of the resultant hexaferrite can be easily tuned. It is believed from a number of experiments that the addition of the dielectric phase can modify the magnetic anisotropy field in the primary phase of the M-type ferrite. It is also believed that substitution of an amount of the ferrite with a cobalt complex, for example, at least one of combined cobalt-titanium or cobalt-zirconium (magnetic phase) can tailor the magnetic structure from uniaxial to an at least partially planar anisotropy or cone-anisotropy to result in the M-type ferrite. It is noted that the M-type ferrite can have an in-plane easy magnetization, cone-structure magnetization, but it is not limited and can have a uniaxial magnetization.

While the crystallographic parameters or magnetic structure of the M-type ferrite is not explicitly known, it is believed, without wishing to be bound by theory, that the M-type ferrite can include a first phase having a c-plane magnetocrystalline anisotropy (herein referred to as the magnetic phase) and a second phase comprising a low dielectric loss ceramic (herein referred to as the dielectric phase). The crystallographic structure of the M-type ferrite throughout the M-type ferrite could the same, indicating complete mixing of the respective phases. In other words, it may not be possible to necessarily separate the magnetic structure or the crystal structure of the two phases. Therefore, the final structure can be either a solid solution of the components or a distinguishable two-phase structure, but entangled each other in any fashions. Therefore, it is noted that the terminology of the M-type ferrite used herein includes a ferrite with a distinguishable two-phase morphology as well as the solid solution of the ferrite, or any combination thereof.

The M-type ferrite can comprise oxides of Me, Me', Me'', Co, Ti, and Fe; wherein Me can be at least one of Ba, Sr, or Pb; Me' can be at least one of Ti, Zr, Ru, or Ir; and Me'' can be at least one of Mg or Ca. The M-type ferrite can have the formula $(Ba_{1.1-x}(CoTi)_{1.2}Fe_{9.6-12.9x}O_{19})$ $z(MgTiO_3)$, wherein z can be 0.005 to 0.3, or 0.005 to 0.2.

The M-type ferrite comprises at least one of cobalt-titanium, cobalt-zirconium, cobalt-ruthenium, or cobalt-iridium, for example, in a magnetic phase. The M-type ferrite can comprise at least one of cobalt-titanium or cobalt-zirconium. The M-type ferrite can comprise a magnetic phase that can have the formula of $MeCo_xMe'_xFe_{12-2x}O_{19}$, wherein Me is at least one of Ba, Sr, or Pb; Me' is at least one of Ti, Zr, Ru, or Ir; and x is 0.1 to 2. The magnetic phase can have the formula of $BaCo_xTi_xFe_{12-2x}O_{19}$. In the magnetic phase formula x can be 0.1 to 1.3, or 0.8 to 1.3, or greater than 1.3 to 2, or 1.5 to 2.

The M-type ferrite can comprise a low dielectric loss ceramic. For example, the M-type ferrite can comprise a dielectric oxide of titanium and at least one of magnesium or calcium. The low dielectric loss can refer to the low dielectric loss as exhibited by a ceramic having the formula $Me''TiO_3$, wherein Me'' is at least one of Mg or Ca. Accordingly, the M-type ferrite, for example, in a dielectric phase can have the formula $Me''TiO_3$, wherein Me'' is at least one of Mg or Ca.

The M-type ferrite (namely, in-plane easy magnetization) can have at least one of a high permeability (μ'), a low magnetic loss tangent (tan $\delta_\mu$), a high resonance frequency, and a high figure of merit (FOM as defined by μ'/tan $\delta_\mu$). The permeability of the M-type ferrite can be greater than or equal to 30, or greater than or equal to 40, or 15 to 60, or 30 to 45 at a frequency of 200 megahertz. The magnetic loss tangent of the M-type ferrite can be less than or equal to 0.8, or less than or equal to 0.3, or 0.001 to 0.8 at a frequency of 200 megahertz. The figure of merit of the M-type ferrite can be greater than or equal to 50, or greater than or equal to 100, or greater than or equal to 230, or 50 to 250 at a frequency of 200 megahertz. The operating frequency of the M-type ferrite can be 30 to 300 megahertz, or 50 to 200 megahertz. The Snoek product of the M-type ferrite can be greater than or equal to 5 gigahertz, or greater than or equal to 20 gigahertz, or greater than or equal to 22 gigahertz, or 10 to 25, or 20 to 25 at over the frequency range of 1 to 300 megahertz. These values can be manipulated by changing the ratio of the magnetic phase and the dielectric phase.

A mole ratio of the magnetic phase to the dielectric phase can be 1:0.005 to 1:0.5; or 1:0.005 to 1:0.15; wherein the mole ratio can be defined by the moles of $MeCo_xMe'_xFe_{12-2x}O_{19}$ relative to the moles of $Me''TiO_3$.

The crystalline structure of the M-type ferrite can have an average grain size of 1 to 100 micrometers, or 5 to 50 micrometers. As used herein the average grain size is measured using at least one of transmission electron microscopy or field emission scanning electron microscopy.

The M-type ferrite can comprise oxides of Me, Me', Me'', Co, Ti, and Fe; wherein Me is at least one of Ba, Sr, or Pb; Me' is at least one of Ti, Zr, Ru, or Ir; and Me'' is at least one of Mg or Ca. The M-type ferrite can comprise a dielectric phase having the formula $Me''TiO_3$. The M-type ferrite can have the formula $(Ba_{1.1-x}(CoTi)_{1.2}Fe_{9.6-12.9x}O_{19})$ $z(MgTiO_3)$, wherein z can be 0.005 to 0.3, or 0.005 to 0.2. The M-type ferrite can comprise a magnetic phase having the formula $MeCo_xMe'_xFe_{12-2x}O_{19}$ and a dielectric phase having the formula $Me''TiO_3$, wherein Me is at least one of Ba, Sr, or Pb; Me' is at least one of Ti, Zr, Ru, or Ir; x is 0.1 to 2; and Me'' is at least one of Mg or Ca. The magnetic phase can have the formula $BaCo_xTi_xFe_{12-2x}O_{19}$. The value of x can be 0.1 to 1.3, or 0.8 to 1.3, or greater than 1.3 to 2, or 1.5 to 2. A mole ratio of the magnetic phase to the dielectric phase can be 1:0.005 to 1:0.5. The M-type ferrite can be in the form of at least one of a solid-solution or a bi-phase or a combination thereof including areas of separate phases and various mixtures thereof. The M-type ferrite can have an average grain size is of 1 to 100 micrometers, or 5 to 50 micrometers as measured using transmission electron microscopy or field emission scanning electron microscopy.

The M-type ferrite can be prepared using any suitable method. Generally, the M-type ferrite can be formed by forming a mixture comprising the precursor compounds including oxides of at least Co, Fe, Ti, Me, Me', and Me'', where it is noted that Me' can be Ti without adding an additional $Me'_2O_3$ including a different Me' element. The precursor compounds can comprise at least $MeCO_3$, $Co_3O_4$, $Ti_2O_3$, $Me'_2O_3$, and $Me''_2O_3$. The oxides can have an average particle size of 3 to 50 micrometers. The mixture can then be milled to form an oxide mixture. The milling can comprise wet milling or dry milling the oxide mixture. The milling of the precursor compounds can comprise milling for less than or equal to 3 hours, or 0.5 to 2 hours. The milling can comprise milling at a milling speed of less than or equal to 400 revolutions per minute (rpm), or 200 to 350 rpm.

Conversely, two or more oxide mixtures can be formed from separate precursor compositions. For example, a first oxide mixture can be formed by milling precursor compounds including oxides of at least Co, Fe, Me, and Me'; and a second oxide mixture can be formed by milling precursor compounds including oxides of at least Ti and Me''.

The oxide mixture(s) can be calcined to form calcined ferrite(s). If more than one oxide mixture is formed, then each oxide mixture independently can be calcined to form their respective calcined ferried. If more than one oxide mixture is formed, then they can be combined and mixed prior to calcining. The calcining can occur at a calcination temperature of 800 to 1,300 degrees Celsius (° C.), or 900 to 1,200° C. The calcining can occur for a calcination time of 0.5 to 20 hours, 1 to 10 hours, or 2 to 5 hours. The calcining can occur in air or oxygen. The ramping temperature up to and down from the calcining temperature can each independently occur at a ramp rate of 1 to 5° C. per minute.

The calcined ferrite(s) can be ground and screened to form coarse particles. If more than one calcined ferrite is formed, then they can be combined prior to the crushing or the screening. The coarse particles can be ground to a size of 0.1 to 20 micrometers, or 0.1 to 10 micrometers. The particles can be ground, for example, in a wet-planetary ball mill by mixing for 2 to 10 hours, or 4 to 8 hours at a milling speed of less than or equal to 600 rpm, or 400 to 500 rpm. The milled mixture can optionally be screened, for example, using a 10 to 300# sieve. The milled mixture can be mixed with a polymer such as poly(vinyl alcohol) to form granules. The granules can have an average particle size of 50 to 300 micrometers. The milled mixture can be formed, for example, by compressing at a pressure of 0.2 to 2 megatons per centimeter squared. The milled mixture, either particulate or formed, can be post-annealed at an annealing temperature of 900 to 1,275° C., or 1,200 to 1,250° C. The annealing can occur for 1 to 20 hours, or 5 to 12 hours. The annealing can occur in air or oxygen. The M-type ferrite can be in the form of a solid-solution or a bi-phase depending on the ratio of the magnetic phase and the dielectric phase and the sintering conditions.

The final M-type ferrite can be in the form of particulates (for example, having a spherical or irregular shape) or in the form of platelets, whiskers, flakes, etc. A particle size of the particulate M-type ferrite can be 0.5 to 50 micrometers, or 1 to 10 micrometers. Platelets of the M-type ferrite can have an average maximum length of 0.1 to 100 micrometers and an average thickness of 0.05 to 1 micrometer.

The M-type ferrite particles can be used to make a composite, for example, comprising the M-type ferrite and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly (ethylene-tetrafluoroethylene (PETFE), or perfluoroalkoxy (PFA)), polyacetals (for example, polyoxyethylene or polyoxymethylene), poly($C_{1-6}$ alkyl)acrylates, polyacrylamides (including unsubstituted and mono-N— or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) or polyether ketone ketones (PEKK)), polyarylene ketones, polyarylene sulfides (for example, polyphenylene sulfides (PPS)), polyarylene sulfones (for example, polyethersulfones (PES) or polyphenylene sulfones (PPS)), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N— or di-N—($C_{1-8}$ alkyl)acrylamides), polyolefins (for example, polyethylenes, such as high density polyethylene (HDPE), low density polyethylene (LDPE), or linear low density polyethylene (LLDPE), polypropylenes, or their halogenated derivatives (such as polytetrafluoroethylenes), or their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers or copolymers thereof, e.g., poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl) acrylate, a ($C_{1-6}$ alkyl)methacrylate, acrylonitrile, vinyl acetate, allyl acetate, triallyl cyanurate, triallyl isocyanurate, or acrylamide.

The polymer can comprise at least one of a fluoropolymer (for example, polytetrafluoroethylene (PTFE)) or a polyolefin (for example, linear low density polyethylene (LLDPE)).

The M-type ferrite composite can comprise 5 to 95 volume percent, or 50 to 80 volume percent of the M-type ferrite based on the total volume of the M-type ferrite composite. The M-type ferrite composite can comprise 5 to 95 volume percent, or 20 to 50 volume percent of the polymer based on the total volume of the M-type ferrite composite. The M-type ferrite composite can be formed by compression molding, injection molding, reaction injection molding, laminating, extruding, calendering, casting, rolling, or the like. The composite can be free of a void space.

As used herein, the magnetic permeability of ferrite samples is measured by Impedance analyzer (E4991B) with a 16454A fixture over a frequency of 1 MHz to 1 GHz. The permeability is the complex permeability, whereas each of the real and imaginary components of the complex permeability stand for the relative permeability and the magnetic loss, respectively.

An article can comprise the M-type ferrite. The article can be an antenna or an inductor core. The article can be for use in the 30 to 300 megahertz frequency range, or 50 to 200 megahertz frequency range. The article can be used for a variety of devices operable within the ultrahigh frequency range, such as a high frequency or microwave antenna, filter, inductor, circulator, or phase shifter. The article can be an antenna, a filter, an inductor, a circulator, or an EMI (electromagnetic interference) suppressor. Such articles can be used in commercial and military applications, weather radar, scientific communications, wireless communications, autonomous vehicles, aircraft communications, space communications, satellite communications, or surveillance.

The following examples are provided to illustrate the present disclosure. The examples are merely illustrative and are not intended to limit devices made in accordance with the disclosure to the materials, conditions, or process parameters set forth therein.

EXAMPLES

The magnetic permeability and the magnetic loss of the ferrites were measured using an Impedance analyzer (E4991B) with a 16454A fixture over a frequency of 1 megahertz (MHz) to 1 gigahertz (GHz).

Examples 1-5: Effect of the Dielectric Phase on the Magnetic Properties after Annealing at 1,200° C.

Oxide mixtures were prepared by mixing $BaCO_3$, $Co_3O_4$, $TiO_2$, $Fe_2O_3$, and MgO in amounts to form the M-type hexaferrite compositions as shown in Table 1. The oxide mixtures were mixed in a wet-plenary ball mill for two hours at 350 revolutions per minute (rpm). The mixture was then calcined at a temperature of 1,150° C. for a soak time of 4 hours in air to form the M-type ferrite compositions.

The M-type hexaferrite compositions were then crushed and screened through 40# sieve to form coarse particles. The coarse particles were ground down to 0.5 to 10 micrometers in a wet-planetary ball mill for six hours at 450 rpm. The granulated ferrite was mixed with 0.5 to 5 wt % of poly (vinyl alcohol) and sieved in a 40# sieve. The sieved material was then compressed at a pressure of 1 megaton per centimeters squared to form ferrite green bodies having a toroid structure with an outer diameter of 18 millimeters (mm), an inner diameter of 10 mm, and a thickness of 3 to 3.5 mm. The green body toroids were post-annealed 1,200° C. for 20 hours in air using ramping and cooling rate of 3 degrees Celsius per minute (° C./min). The compositions of the resultant ferrite compositions had the formula $(Ba_{1.1-x}(CoTi)_{1.2}Fe_{9.6-12.9x}O_{19})$ z$(MgTiO_3)$, where the values of z are shown in Table 1.

The magnetic properties at 50 MHz, 100 MHz, and 200 MHz are shown in Table 1 and the magnetic permeability and magnetic loss with frequency are shown in FIG. 1.

TABLE 1

| | Example | | | | |
|---|---|---|---|---|---|
| | 1 | 2 | 3 | 4 | 5 |
| z | 0 | 0.01 | 0.05 | 0.10 | 0.15 |
| Frequency of 50 MHz | | | | | |
| μ' | 43 | 25 | 21 | 28 | 26 |
| $\tan\delta_\mu$ | 0.05 | 0.02 | 0.02 | 0.03 | 0.04 |
| FOM | 860 | 1224 | 1046 | 787 | 543 |
| Frequency of 100 MHz | | | | | |
| μ' | 49 | 26 | 22 | 30 | 27 |
| $\tan\delta_\mu$ | 0.17 | 0.05 | 0.03 | 0.07 | 0.09 |
| FOM | 279 | 515 | 583 | 394 | 288 |
| Frequency of 200 MHz | | | | | |
| μ' | 37 | 31 | 25 | 35 | 30 |
| $\tan\delta_\mu$ | 0.8 | 0.3 | 0.11 | 0.31 | 0.26 |
| FOM | 47 | 101 | 230 | 113 | 113 |
| SP (GHz) | 13 | 7.5 | 7.4 | 8.9 | 10 |

The data in Table 1 shows that the presence of the dielectric phase in Examples 2-5 results in a desirable increase in the figure of merit at almost all frequencies from 50 to 200 MHz relative to that of Example 1.

Examples 6-10: Effect of the Dielectric Phase on the Magnetic Properties after Annealing at 1,240° C.

Figure 2:
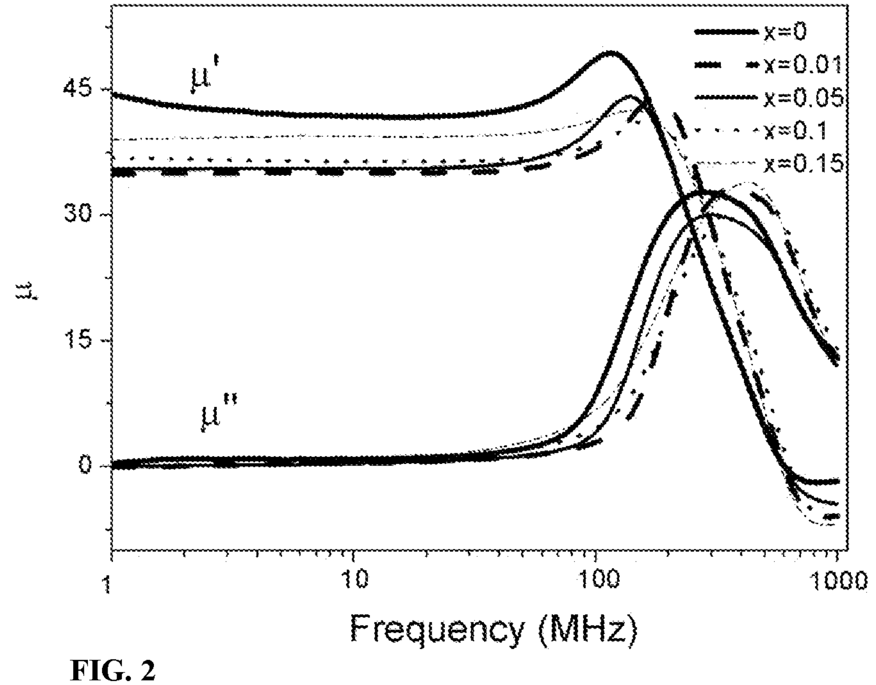
FIG. 2 is a graphical illustration of the magnetic properties of the compositions of Examples 6-10.

Five more compositions were prepared in accordance with Examples 1-5, except the compositions were annealed at 1,240° C. The compositions of the resultant ferrite compositions had the formula $(Ba_{1.1-x}(CoTi)_{1.2}Fe_{9.6-12.9x}O_{19})$ z$(MgTiO_3)$, where the values of z are shown in Table 2. The magnetic properties at 50 MHz, 100 MHz, and 200 MHz are shown in Table 2 and the magnetic permeability and magnetic loss with frequency are shown in FIG. 2.

TABLE 2

| | Example | | | | |
|---|---|---|---|---|---|
| | 6 | 7 | 8 | 9 | 10 |
| z | 0 | 0.01 | 0.05 | 0.10 | 0.15 |
| Frequency of 50 MHz | | | | | |
| μ' | 44 | 35 | 36 | 37 | 40 |
| $\tan\delta_\mu$ | 0.05 | 0.03 | 0.03 | 0.05 | 0.07 |
| FOM | 861 | 1044 | 1039 | 694 | 552 |
| Frequency of 100 MHz | | | | | |
| μ' | 49 | 38 | 41 | 39 | 41 |
| $\tan\delta_\mu$ | 0.17 | 0.07 | 0.09 | 0.12 | 0.16 |
| FOM | 286 | 498 | 442 | 327 | 254 |
| Frequency of 200 MHz | | | | | |
| μ' | 37 | 43 | 37 | 40 | 40 |
| $\tan\delta_\mu$ | 0.8 | 0.43 | 0.68 | 0.45 | 0.53 |
| FOM | 46 | 99 | 54 | 88 | 75 |
| SP (GHz) | 13 | 15 | 10.4 | 17 | 16.2 |

The data in Table 2 shows that the presence of the dielectric phase in Examples 7-10 results in a desirable increase in the figure of merit at almost all frequencies from 50 to 200 MHz relative to that of Example 6. Table 2 further shows that the compositions of Examples 7-10 have increased permeabilities relative to Examples 2-5 and that they can have an increased Snoek product relative to that of Example 6.

Examples 11-15: Effect of the Dielectric Phase on the Magnetic Properties after Annealing at 1,280° C.

Figure 3:
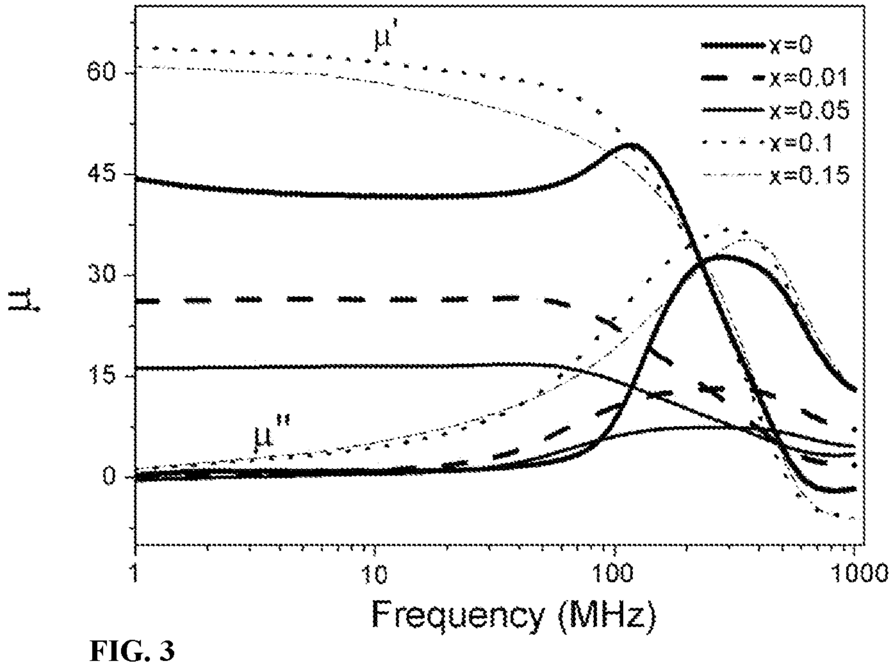
FIG. 3 is a graphical illustration of the magnetic properties of the compositions of Examples 11-15.

Five more compositions were prepared in accordance with Examples 1-5, except the compositions were annealed at 1,280° C. The compositions of the resultant ferrite compositions had the formula $(Ba_{1.1-x}(CoTi)_{1.2}Fe_{9.6-12.9x}O_{19})$ z$(MgTiO_3)$, where the values of z are shown in Table 3. The magnetic properties at 50 MHz, 100 MHz, and 200 MHz are shown in Table 3 and the magnetic permeability and magnetic loss with frequency are shown in FIG. 3.

TABLE 3

| | Example | | | | |
|---|---|---|---|---|---|
| | 11 | 12 | 13 | 14 | 15 |
| z | 0 | 0.01 | 0.05 | 0.10 | 0.15 |
| Frequency of 50 MHz | | | | | |
| μ' | 43 | 26 | 17 | 58 | 53 |
| $\tan\delta_\mu$ | 0.05 | 0.21 | 0.18 | 0.22 | 0.24 |
| FOM | 860 | 125 | 93 | 265 | 219 |
| Frequency of 100 MHz | | | | | |
| μ' | 49 | 22 | 14 | 52 | 48 |
| $\tan\delta_\mu$ | 0.17 | 0.47 | 0.42 | 0.46 | 0.4 |
| FOM | 279 | 48 | 34 | 113 | 119 |

TABLE 3-continued

| | Example | | | | |
|---|---|---|---|---|---|
| | 11 | 12 | 13 | 14 | 15 |
| Frequency of 200 MHz | | | | | |
| μ' | 37 | 15 | 10 | 35 | 37 |
| $\tan\delta_\mu$ | 0.8 | 0.83 | 0.74 | 0.96 | 0.8 |
| FOM | 47 | 18 | 14 | 37 | 46 |
| SP (GHz) | 13 | 9.4 | 7.1 | 20.3 | 22.5 |

The data in Table 3 shows that, when annealed at 1,280° C., the presence of the dielectric phase in Examples 12-15 did not result in an increase in the figure of merit relative to that of Example 11. Table 3 shows though that Examples 14 and 15 result in compositions having a high Snoek Product of greater than 20.

Set forth below are non-limiting aspects of the present disclosure.

Aspect 1: An M-type ferrite, comprising: oxides of Me, Me', Me", Co, Ti, and Fe; wherein Me is at least one of Ba, Sr, or Pb; Me' is at least one of Ti, Zr, Ru, or Ir; and Me" is at least one of Mg or Ca. The M-type ferrite can comprise a dielectric phase having the formula $Me''TiO_3$.

Aspect 2: The M-type ferrite of Aspect 1, wherein the M-type ferrite comprises a magnetic phase having the formula $MeCo_xMe'_xFe_{12-2x}O_{19}$, wherein Me is at least one of Ba, Sr, or Pb; Me' is at least one of Ti, Zr, Ru, or Ir; and x is 0.1 to 2; and a dielectric phase having the formula $Me''TiO_3$, wherein Me" is at least one of Mg or Ca; or wherein the M-type ferrite has a formula of $(Ba_{1.1-x}(CoTi)_{1.2}Fe_{9.6-12.9x}O_{19})$ $z(MgTiO_3)$, wherein z is 0.005 to 0.3, or 0.005 to 0.2.

Aspect 3: The M-type ferrite of Aspect 2, wherein the magnetic phase has the formula of $BaCo_xTi_xFe_{12-2x}O_{19}$.

Aspect 4: The M-type ferrite of Aspect 2 or 3, wherein x is 0.1 to 1.3, or 0.8 to 1.3, or greater than 1.3 to 2, or 1.5 to 2.

Aspect 5: The M-type ferrite of any of Aspects 2 to 4, wherein a mole ratio of the magnetic phase to the dielectric phase is 1:0.005 to 1:0.5.

Aspect 6: The M-type ferrite of any of the preceding aspects, wherein the M-type ferrite is in the form of at least one of a solid-solution or a bi-phase.

Aspect 7: The M-type ferrite of any of the preceding aspects, wherein the M-type ferrite has an average grain size is of 1 to 100 micrometers, or 5 to 50 micrometers as measured using transmission electron microscopy or field emission scanning electron microscopy.

Aspect 8: The M-type ferrite of any of the preceding aspects, wherein the M-type ferrite has a permeability of greater than or equal to 30, or greater than or equal to 40, or 15 to 60, or 30 to 45 at a frequency of 200 megahertz.

Aspect 9: The M-type ferrite of any of the preceding aspects, wherein the M-type ferrite has a figure of merit of greater than or equal to 50, or greater than or equal to 100, or greater than or equal to 230, or 50 to 250 at a frequency of 200 megahertz.

Aspect 10: The M-type ferrite of any of the preceding aspects, wherein the M-type ferrite has a magnetic loss tangent tan % of less than or equal to 0.8, or less than or equal to 0.3, or 0.001 to 0.8 at a frequency of 200 megahertz.

Aspect 11: The M-type ferrite of any of the preceding aspects, wherein the M-type ferrite has a Snoek product of greater than or equal to 5 gigahertz, or greater than or equal to 20 gigahertz, or greater than or equal to 22 gigahertz, or 10 to 25, or 20 to 25 at over the frequency range of 1 to 300 megahertz.

Aspect 12: A composite comprising a polymer and the M-type ferrite of any of the preceding aspects.

Aspect 13: The composite of Aspect 12, wherein the polymer comprises at least one of a fluoropolymer or a polyolefin.

Aspect 14: An article comprising the ferrite composition of any of Aspects 1 to 11 or the composite of any one of Aspects 12 to 13.

Aspect 15: The article of Aspect 14, wherein the article is an antenna, a filter, an inductor, a circulator, or an EMI suppressor.

Aspect 16: A method of making an M-type ferrite (optionally of any of Aspects 1 to 11) comprising: milling ferrite precursor compounds comprising oxides of at least Co, Fe, Ti, Me, Me', and Me", to form an oxide mixture; wherein Me comprises at least one of Ba, Sr, or Pb; Me' is at least one of Ti, Zr, Ru, or Ir; and Me" is at least one of Mg or Ca; and calcining the oxide mixture in an oxygen or air atmosphere to form the M-type ferrite.

Aspect 17: The method of Aspect 16, wherein the milling the ferrite precursor compounds comprises: milling the ferrite precursor compounds comprising oxides of at least Co, Fe, Me, and Me' to form a first oxide mixture; and milling the ferrite precursor compounds comprising oxides of at least Ti and Me" to form a second oxide mixture; wherein the calcining comprises separately calcining the first oxide mixture and the second oxide mixture or calcining a mixture comprising the first oxide mixture and the second oxide mixture.

Aspect 18: The method of Aspect 17, wherein the calcining comprises separately calcining the first oxide mixture and the second oxide mixture to form separately calcined mixtures; and the method further comprises mixing the separately calcined mixture to form the M-type ferrite.

Aspect 19: The method of any of Aspects 16 to 18, wherein the milling occurs for greater than or equal to 4 hours; or at a mixing speed of greater than or equal to 300 revolutions per minute.

Aspect 20: The method of any of Aspects 16 to 19, further comprising post-annealing the M-type ferrite in an oxygen or air atmosphere after the high energy milling; wherein the post-annealing occurs at an annealing temperature of 900 to 1,275° C., or 1,200 to 1,250° C. for an annealing time of 1 to 20 hours, or 5 to 12 hours.

Aspect 21: The method of any of Aspects 16 to 20, wherein the calcining the calcined ferrite occurs at a calcining temperature of 800 to 1,300° C., or 900 to 1,200° C. for a calcining time of 0.5 to 20 hours, or 1 to 10 hours.

Aspect 22: The method of any of Aspects 16 to 21, further comprising forming a composite comprising the M-type ferrite and a polymer.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An M-type ferrite, comprising:

a magnetic phase having the formula $$MeCo_xMe'_xFe_{12-2x}O_{19},$$

wherein Me is at least one of Ba, Sr, or Pb,

Me' is at least one of Ti, Zr, Ru, or Ir, and x is 0, 1 to 2, and a dielectric phase having the formula $Me''TiO_3$, wherein Me" is at least one of Me or Ca.

2. The M-type ferrite of claim 1, wherein Me" is Mg.

3. The M-type ferrite of claim 2, wherein the magnetic phase has the formula of $BaCo_xTi_xFe_{12-2x}O_{19}$.

4. The M-type ferrite of claim 2, wherein x is 0.1 to 1.3.

5. The M-type ferrite of any of claim 2, wherein a mole ratio of the magnetic phase to the dielectric phase is 1:0.005 to 1:0.15.

6. The M-type ferrite of claim 1, wherein the M-type ferrite is in the form of at least one of a solid-solution or a bi-phase.

7. The M-type ferrite of claim 1, wherein the M-type ferrite has an average grain size is of 1 to 100 micrometers, as measured using transmission electron microscopy or field emission scanning electron microscopy.

8. The M-type ferrite of claim 5, wherein the M-type ferrite has a permeability of greater than or equal to 30 at a frequency of 200 megahertz.

9. The M-type ferrite of claim 5, wherein the M-type ferrite has a figure of merit of greater than or equal to 50 at a frequency of 200 megahertz.

10. The M-type ferrite of claim 5, wherein the M-type ferrite has a magnetic loss tangent tan $\delta_\mu$ of less than or equal to 0.8 at a frequency of 200 megahertz.

11. The M-type ferrite of claim 5, wherein the M-type ferrite has a Snoek product of greater than or equal to 5 gigahertz at over the frequency range of 1 to 300 megahertz.

12. A composite comprising a polymer and the M-type ferrite of claim 1.

13. The composite of claim 12, wherein the polymer comprises at least one of a fluoropolymer or a polyolefin.

14. An article comprising the ferrite composition of claim 1.

15. The article of claim 14, wherein the article is an antenna, a filter, an inductor, a circulator, or an EMI suppressor.

16. A method of making the M-type ferrite of claim 1 comprising:

milling ferrite precursor compounds comprising oxides of at least Co, Fe, Ti, Me, Me', and Me", to form an oxide mixture; and calcining the oxide mixture in an oxygen or air atmosphere to form the M-type ferrite.

17. The method of claim 16, wherein the milling the ferrite precursor compounds comprises:

milling the ferrite precursor compounds comprising oxides of at least Co, Fe, Me, and Me' to form a first oxide mixture; and milling the ferrite precursor compounds comprising oxides of at least Ti and Me" to form a second oxide mixture;

wherein the calcining comprises separately calcining the first oxide mixture and the second oxide mixture or calcining a mixture comprising the first oxide mixture and the second oxide mixture.

18. The method of claim 17, wherein the calcining comprises separately calcining the first oxide mixture and the second oxide mixture to form separately calcined mixtures; and the method further comprises mixing the separately calcined mixture to form the M-type ferrite.

19. The method of claim 16, wherein the milling occurs for greater than or equal to 4 hours; or at a mixing speed of greater than or equal to 300 revolutions per minute.

20. The method of claim 16, further comprising post-annealing the M-type ferrite in an oxygen or air atmosphere after the milling; wherein the post-annealing occurs at an annealing temperature of 900 to 1,275° C. for an annealing time of 1 to 20 hours.

21. The method of claim 16, wherein the calcining the oxide mixture occurs at a calcining temperature of 800 to 1,300° C. for a calcining time of 0.5 to 20 hours.

22. The method of claim 16, further comprising forming a composite comprising the M-type ferrite and a polymer.

* * * * *